United States Patent [19]

Dlugos

[11] 4,390,952

[45] Jun. 28, 1983

[54] MAILING SYSTEM WITH SEQUENTIAL PRINTING CONTROL

[75] Inventor: Daniel F. Dlugos, Huntington, Conn.

[73] Assignee: Pitney Bowes Inc., Stamford, Conn.

[21] Appl. No.: 163,596

[22] Filed: Jun. 27, 1980

[51] Int. Cl.[3] .............................................. G06F 15/20

[52] U.S. Cl. .................................. 364/464; 364/466; 364/567; 364/900; 177/25

[58] Field of Search ............... 364/464, 466, 567, 571, 364/518, 523, 568, 200, 900; 235/92 WT, 432; 177/25, 4

[56] References Cited

U.S. PATENT DOCUMENTS

| | | | |
|---|---|---|---|
| 3,635,297 | 9/1972 | Dlugos et al. | 364/466 |
| 3,724,570 | 4/1973 | Chenut | 177/4 |
| 3,890,492 | 6/1975 | Manduley | 364/466 |
| 4,280,180 | 7/1981 | Eckert | 364/464 |
| 4,286,325 | 8/1981 | Dlugos et al. | 364/466 |
| 4,301,507 | 11/1981 | Soderberg | 364/464 |
| 4,302,821 | 11/1981 | Eckert | 364/464 |
| 4,326,254 | 4/1982 | Uchimura et al. | 364/464 |
| 4,349,391 | 9/1982 | Uchimura et al. | 364/466 |

*Primary Examiner*—Mark E. Nusbaum
*Assistant Examiner*—Michael R. Fleming
*Attorney, Agent, or Firm*—Robert H. Whisker; William D. Soltow, Jr.; Albert W. Scribner

[57] ABSTRACT

A processor controlled automated mailing system for determining and printing the requisite postage for mailing an article includes a scale, a keyboard for operator input, a display and a meter setting device. After the requisite postage has been determined, a postage printing cycle is initiated by the operator. The processor determines whether the calculated postage value exceeds the digit printing capacity of the meter and, if so, advises the operator. The operator then determines if an entry error has been made and if not, reactivates the printing cycle. The processor thereafter initiates the meter setting device to sequentially print multiple tapes with each depression of the print key until the total value printed reaches the calculated postage value. An alternate embodiment incorporates a circuit for implementation of the method without processor control.

8 Claims, 6 Drawing Figures

MAILING SYSTEM WITH SEQUENTIAL PRINTING CONTROL

RELATED APPLICATIONS

This application is related to a co-pending application of Daniel F. Dlugos et al entitled "System and Method for Computing Domestic and International Postage", Ser. No. 70,234, filed Aug. 27, 1979, and assigned to the assignee of the present invention.

BACKGROUND OF THE INVENTION

1. Field of the Invention

This invention relates generally to automated mailing systems and more particularly to an apparatus and method for controlling a postage meter to print a calculated postage value which exceeds the maximum digit printing capacity of the meter.

2. Brief Description of the Prior Art

Various devices and methods for calculating postage have been proposed heretofore. These systems ranged from simple postage value storage tables as shown in U.S. Pat. No. 3,635,297 to more elaborate value calculating systems featuring the use of microprocessors for a calculation of requisite postage.

In U.S. Pat. No. 3,978,457 issued Aug. 31, 1976 and assigned to the assignee of the present invention, a microcomputerized electronic postage meter system was disclosed. Such postage meter systems present prospects of greatly enhanced mail handling systems wherein articles to be mailed can be sealed, weighed, the requisite postage calculated and applied thereto.

One of the problems which has been encountered in the design of mailing systems has been that various processor controlled meter setting devices were limited to dispensing a maximum postage dictated by the digit capacity of the incorporated postage meter. For example, if a three-bank meter was incorporated in such system, the maximum postage setting which could be obtained and printed was $9.99. Thus, in instances wherein the calculated postage exceeded this maximum value, prior processor controlled systems lacked the ability to appropriately print the requisite postage.

SUMMARY OF THE INVENTION

In compendium, the present invention relates to a system and method for computing postage for mailing an article and dispensing the computed amount. In accordance with the invention, an automated mailing system includes a system processor (CPU) which receives postal information for determining the appropriate postage. The processor thereafter accesses postal rate data stored at memory locations and determines the requisite postage value for the article.

When a postage printing cycle is initiated by an operator, the processor determines whether the calculated postage value to be dispensed exceeds the digit printing capacity of the meter. If the calculated value does not exceed the digit printing capacity, a meter setting device is actuated and the calculated postage is imprinted on a tape to be applied to the article.

In instances wherein the calculated postage value exceeds the digit printing capacity of the meter, the calculated postage value is flashed at a display. The operator then verifies that the postage value is to be dispensed and if so, reactuates the printing cycle. Thereafter, upon subsequent multiple print key depressions, the meter setting device dispenses the calculated postage value on sequential tapes, the sum of which equates to the calculated value.

An alternate embodiment includes comparators, accumulators and display latches in lieu of processor implementation.

From the foregoing summary, it will be seen that it is an object of the present invention to provide a mailing system of the general character described which is not subject to the disadvantages of the prior art as aforementioned.

Another object of the present invention is to provide a mailing system of the general character described wherein a postage value which exceeds the digit printing capacity of a processor controlled postage meter can be dispensed.

Another object of the present invention is to provide a mailing system of the general character described which reduces the likelihood of excessive postage expenditures caused by operator introduced errors.

A further object of the present invention is to provide a mailing system of the general character described which is simple in operation and safeguards against the inadvertent dispensing of inordinately high postage amounts.

Further objects of the present invention in part will be obvious and in part will be pointed out hereinafter.

With these ends in view, the invention finds embodiment in certain combinations of elements, arrangements of parts and series of steps by which the objects aforementioned and various other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various exemplary possible embodiments of the invention.

DESCRIPTION OF THE PREFERRED EMBODIMENTS

Figure 1:
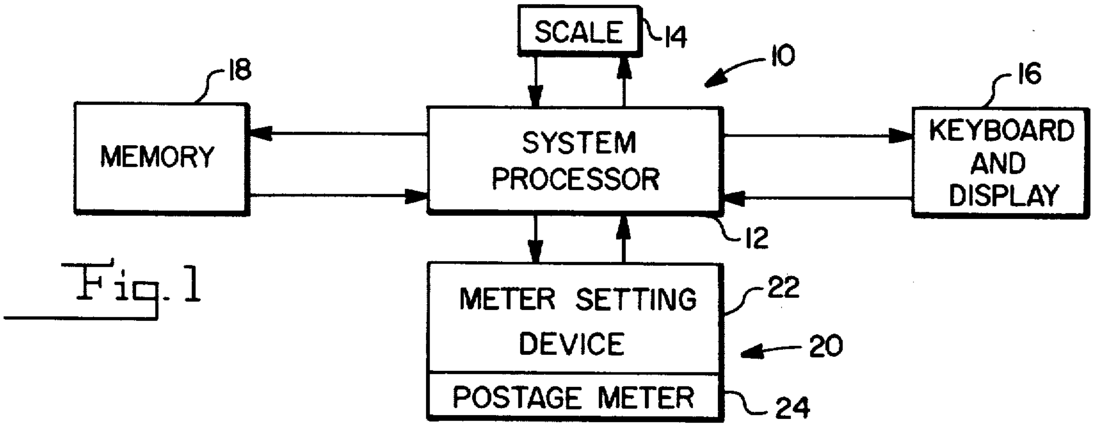
FIG. 1 is a schematized block diagram of an automated mailing system constructed in accordance with the present invention.

Referring now in detail to the drawings, the reference numeral 10 denotes generally an automated mailing system constructed in accordance with and embodying the invention. The system 10 includes a central processor (CPU) 12 which is programmed for the calculation of postage charges dependent upon article weight and postal information such as transportation class and destination. The mailing system 10 includes a scale 14 which provides article weight information and an operator keyboard and display 16 through which postal information such as carrier type, transportation class, destination, oversized package, special fees, etc. are received. The processor 12 accesses a memory 18 to retrieve stored information necessary for the generation of a postage value for the article.

After determining the proper postage value for transporting the article to the desired location, the processor 12 displays the postage value and an operator initiated postage printing cycle transmits an appropriate command signal to a meter station 20. The meter station 20 includes a meter setting device 22 and a postage meter 24 which may comprise, by way of example, a Pitney Bowes Series 5300 meter. The meter is adapted to dispense the calculated postage by imprinting dollar values on a tape which is thereafter affixed to the article.

More detailed descriptions of the communications links between the system processor 12 and the various input/output device subsystem processors as well as a typical program for the automated mailing system 10 are to be found in the co-pending related application entitled "System and Method for Computing Domestic and International Postage", Ser. No. 070,234 now issued as U.S. Pat. No. 4,286,325 Aug. 25, 1981, which is hereby included by reference.

Figure 2:
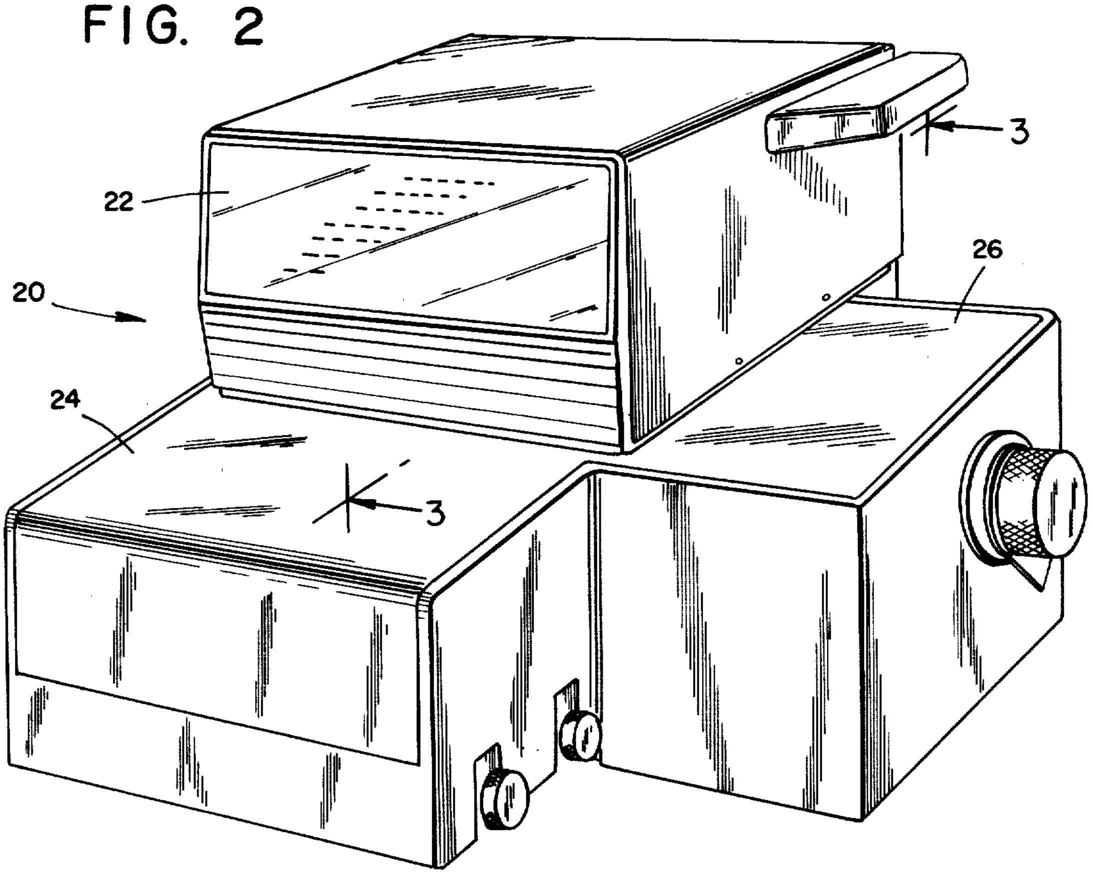
FIG. 2 is a perspective illustration of a typical postage meter station as may be employed in the mailing system including a meter setting device.
Figure 3:
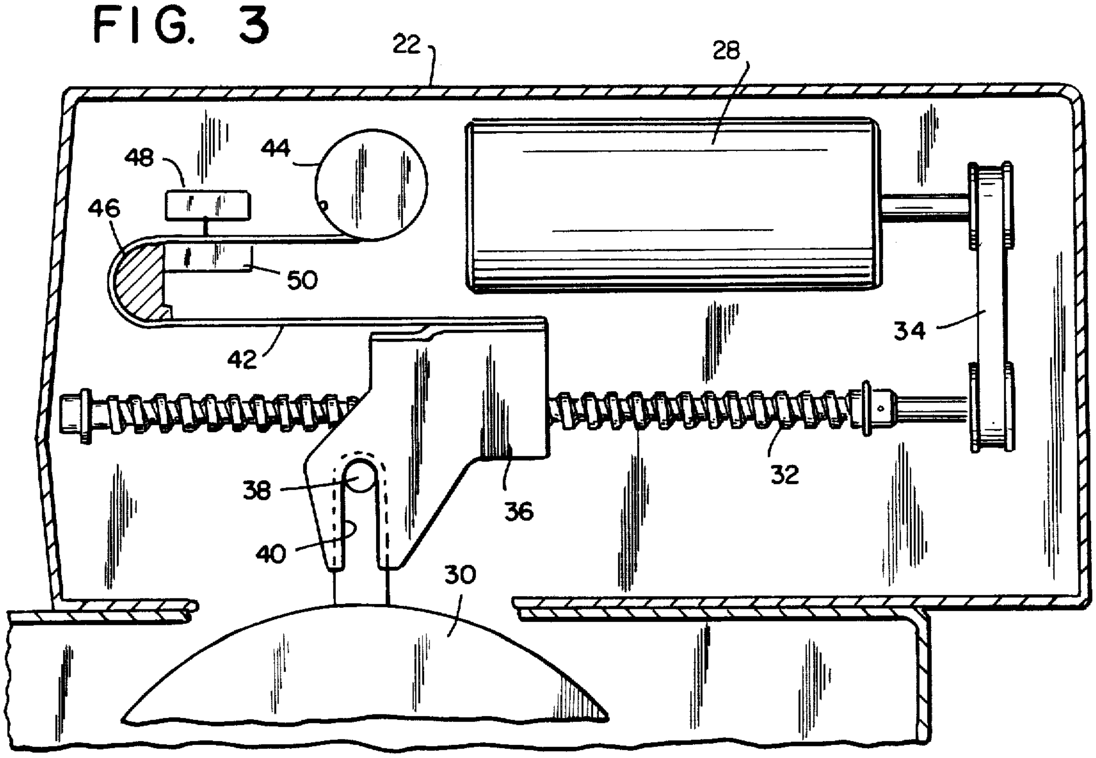
FIG. 3 is a fragmentary sectional view through the meter setting device and a segment of the postage meter controlled thereby with portions deleted for clarity and showing the engagement between the meter setting device and a meter setting lever.

Details of the meter station are illustrated in FIGS. 2 and 3 wherein the meter setting device 22 is shown positioned above and in engagement with the postage meter 24. Additionally shown in FIG. 2 is a remote meter resetting system 26 for resetting registers of the meter 24 as described in U.S. Pat. No. 3,664,231 issued to Hanson on May 23, 1972 and assigned to the assignee of the present invention. The employment of a Pitney Bowes 5300 postage meter with a register accounting system is merely exemplary. The present invention is well adapted for implementation in systems wherein postage accounting functions are processor controlled.

The relative position of exemplary components of the meter setting device 22 are depicted in FIG. 3 wherein mounting members and other details have been deleted for clarity. As illustrated, the meter setting device 22 includes a bidirectional DC motor 28 for controlling the position of a meter setting lever 30. The motor 28 rotates to actuate a lead screw 32 through a low mass drive belt and pulley system 34. Rotation of the lead screw 32 causes a carrier nut 36 to translate while maintaining engagement with the meter setting lever 30 through a lever tip 38 which is engaged in a clevis 40 of the carrier nut 36.

With a DC voltage of one polarity applied, rotation of the motor will cause movement of the carrier nut 36 and the meter setting lever 30 in one direction while reverse actuation of the motor will cause the carrier nut and lever 30 to move in the opposite direction. Movement of the carrier nut 36 which is in engagement with the meter setting lever 30 changes the setting of a single bank, i.e. a single print wheel, of the postage meter through a gearing system.

The position of the carrier nut 36 is monitored and appropriate signals transmitted to the system processor 12 through an encoded tape 42, one end of which is fixed to the carrier nut 36 and the opposite end of which is secured to a takeup reel 44. Intermediate its ends, the tape 42 extends around a guide 46 and a suitable position detecting device such as a light source 48 and photodetector 50 may be employed. Alternately, the tape 42 may be magnetically encoded and a magnetic reading head utilized to detect the position of the carrier nut 36.

It should be appreciated that the meter setting device 22 includes a similar motor driven carrier nut and position detector system for each bank of the postage meter 24. Typically, a Pitney Bowes Series 5300 meter may comprise a three bank meter, (the maximum dollar printing capacity being $9.99) or a four bank meter (the maximum dollar printing capacity being $99.99).

The user of the automated mailing system 10 selects the appropriate number of banks for its postage meter by determining the maximum anticipated postage which the system is expected to calculate and imprint with regard to a single article to be mailed. The system 10 is appropriately keyed to indicate whether a three or four bank meter is being employed. In the event a three bank meter is initially utilized and the user subsequently wishes to convert, the three bank meter and meter setting device are replaced with a four bank meter and four bank meter setting device. The system is then rekeyed to indicate the increased digit capacity.

Pursuant to the present invention, after the requisite postage has been calculated and displayed by the processor 12, the processor inquires as to whether or not the calculated value to be printed is in excess of the meter digit printing capacity. This determination is made after the operator initiates a postage printing cycle by depressing a PRINT button.

Figure 4:
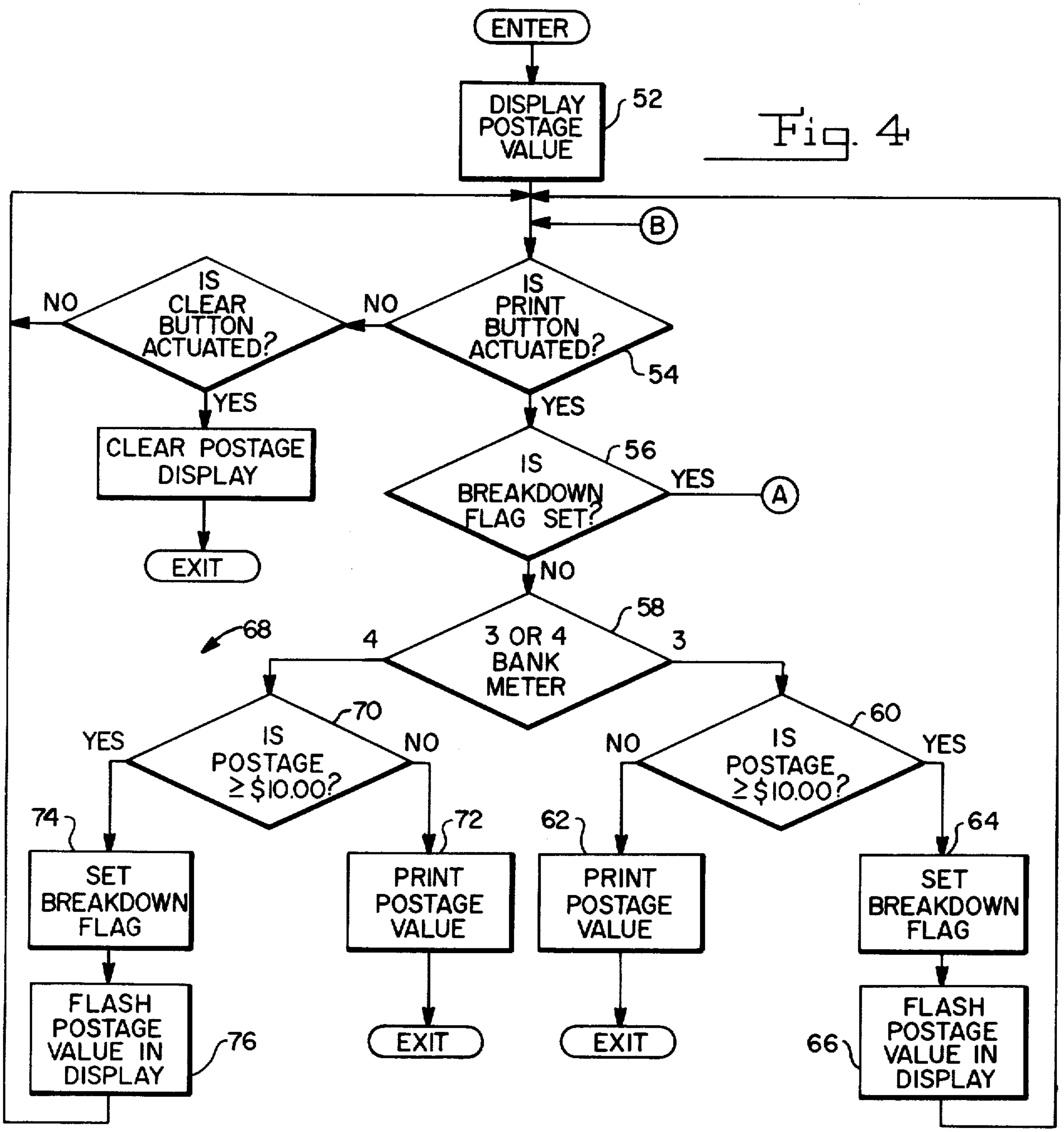
FIG. 4 is a flow diagram of a typical system processor subroutine for printing a calculated postage value and illustrating a procedure by which a printing cycle is interrupted and the calculated postage value flashed in a display after a determination has been made that the calculated postage value exceeds the digit printing capacity of the system postage meter.
Figure 5:
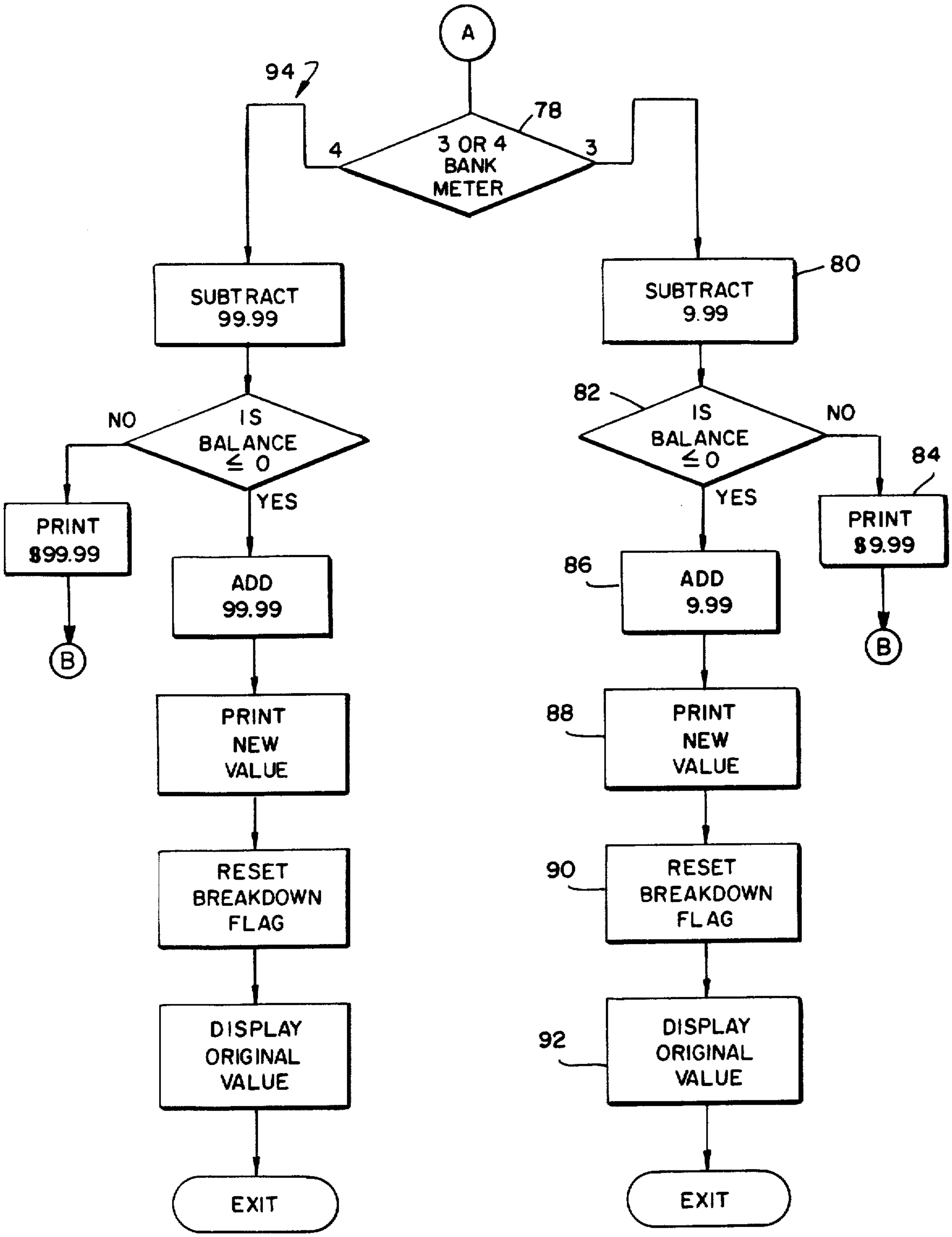
FIG. 5 is a flow diagram of a subroutine pursuant to which the meter setting device is actuated so sequentially print multiple tapes until the total value printed reaches the calculated postage value.

With reference now to FIGS. 4 and 5 wherein a portion of the postage print cycle subroutine is depicted, the program initially displays the calculated postage value as indicated in a block 52. Thereafter, an inquiry is made as shown at a decision block 54 regarding operator initiation of the cycle. If the cycle has been initiated by actuation of the PRINT button, a further determination is made as indicated at a decision block 56, whether or not a BREAKDOWN flag has been set.

The BREAKDOWN flag indicates a prior determination that the calculated postage to be dispensed exceeds the digit printing capacity of the meter 24 and that the postage value must be "broken down" in successive increments, each of which does not exceed the meter digit capacity. If the BREAKDOWN flag has been set, the program branches to a BREAKDOWN subroutine (A) illustrated in FIG. 5.

If the BREAKDOWN flag has not been set, an inquiry is made as indicated at a decision block 58 as to whether the system 10 is equipped with a three or four bank meter. If the system includes a three bank meter, a further determination is made as illustrated at a decision block 60 as to whether or not the calculated postage value to be printed exceeds the digit capacity of the meter, i.e. whether or not the calculated postage is greater than or equal to $10.00 (assuming the smallest print increment is $0.01).

In the event the calculated postage does not exceed the printing capacity of the meter, a signal is transmitted to the postage meter station subsystem processor for imprinting the requisite postage on a tape as indicated generally in a block 62.

If, on the other hand, the calculated postage value is in excess of the digit printing capacity of the meter (at block 60), a BREAKDOWN flag is set as indicated at a block 64; the calculated postage value is flashed at the display as indicated in a further block 66; and the program returns to the decision block 54 awaiting reactuation of the PRINT button.

The purpose of flashing the calculated postage value in the display and awaiting a reactuation of the PRINT button is to provide an opportunity for the operator to verify the postal information entries. This is necessary since the calculation of a postage value which is in excess of the anticipated article, carrier type, and/or destination usage of the system 10 is an extraordinary occurrence. Under such circumstances, before proceeding with such postage expenditure, the operator is prompted and a second depression of the PRINT button is required.

As previously mentioned, as illustrated at the decision block 58, a determination was made as to whether or not the system employs a three or four bank meter. In the event a three bank meter system is upgraded to a four bank system, the service technician keys the system to indicate the implementation of a four bank meter and the subroutine enters a branch 68 wherein similar determinations and functions are followed using the higher four bank postage value criteria and without the need for reprogramming the system. Naturally, the branch 68 will be entered on all four bank meter systems regardless of an upgrading.

Upon entering the branch 68, a determination is made as to whether the calculated postage value exceeds the four digit printing capacity of the meter as indicated in a block 70. If not, the calculated postage value is printed as shown in a block 72. In the event the calculated value exceeds the four digit printing capacity of the meter, the BREAKDOWN flag is set as shown in a block 74; the postage value is flashed in the display as shown in a block 76; and the subroutine returns to the block 54, with the processor awaiting the reactuation of the PRINT button by the operator.

Assuming that a postage value of $13.55 has been calculated and the system 10 is equipped with a three bank meter, when the program enters the decision block 60, the determination is made that the calculated postage is indeed greater than or equal to $10.00. The BREAKDOWN flag is set as shown in the block 64; the $13.55 calculated postage value is flashed in the display as shown in the block 66, and the program returns to the block 54.

At this point, the operator's attention is directed to the fact that the value calculated exceeds the digit printing capacity of the meter. The operator could then verify that indeed the proper postage data had been calculated and reactuate the printing cycle by again depressing the PRINT button. If the operator recognizes that an entry error has been made, the system would be cleared to re-enter the correct data.

If the operator verifies the calculated value by depressing the PRINT button for the second time, the program enters the decision block 56 and is branched to the subroutine indicated in FIG. 5 since the BREAKDOWN flag has been set.

Referring now to FIG. 5, a determination is then made as to whether the system incorporates a three or four bank meter as shown in a block 78. Since a three bank meter has been employed in this example, 9.99 is subtracted from the calculated value as shown in a block 80. This leaves a balance of 3.56.

An inquiry is then made as shown in a decision block 82 whether or not the balance remaining is less than or equal to zero. Since the balance of 3.56 is greater than zero, a signal is transmitted to the meter station to print a value of $9.99 on a tape as shown in a block 84.

The program then loops back to the decision block 54 (FIG. 4) and awaits a subsequent depression of the print key by the operator. Once the key is pressed, the program proceeds through the decision blocks 56 and 78 after which it re-enters the block 80 and subtracts 9.99 from the prior balance of 3.56. A determination is then made as shown at the decision block 82 as to whether or not the balance remainder of −6.43 is equal to or less than zero. On this pass through the decision block 82, the remainder is indeed equal to or less than zero and now the amount of 9.99 is added to the remainder as shown in a block 86. A signal is then transmitted to print the new balance value of $3.56 as shown in a block 88.

This print signal is transmitted to the meter station 20 and the value is printed on the next sequential postage tape. The BREAKDOWN flag is reset as shown in a block 90 and the original calculated postage value is again displayed as shown in a block 92 after which the program exits.

It should be appreciated that the program will loop between the $9.99 print block 84 and the 9.99 subtraction block 80 the requisite number of times until the remaining balance of the calculated postage value is less than or equal to zero. Thus, in accordance with the present invention, the least number of individual postage tapes will be printed upon each subsequent print key depression until the total calculated postage value has been printed on a series of sequential tapes. The operator thereafter affixes the printed tapes to the article.

As discussed previously, in the event the system 10 incorporates a four bank meter, the subroutine has been programmed to implement the corresponding functions utilizing the higher four digit printing criterion of the meter. This branch is indicated generally by the reference numeral 94 in FIG. 5. Thus, reprogramming of the system is not required to accommodate a subsequent upgrading from a three bank to a four bank meter or downgrading from a four bank to a three bank meter.

The present invention additionally contemplates the automatic sequential printing of multiple tapes without the necessity for the operator to depress the print key for each sequential printing. In such instance, the print cycle subroutine loops directly between the block 84 (wherein the maximum value is printed) and the block 80 wherein the maximum value is subtracted from the incoming value without passing through the decision blocks 54, 56 and 78.

As more fully described in U.S. Pat. No. 4,286,325, the system processor 12 (CPU) may comprise a PPS-4/one chip microcomputer, MM-76 Series. Various subsystem processors such as a processor used in conjunction with the scale 14 may comprise MM-78 Series microcomputers and the meter station subsystem processor may comprise a MM-77 Series microcomputer, all of the foregoing microcomputers being currently available from Rockwell International Corporation of Annaheim, Calif.

Figure 6:
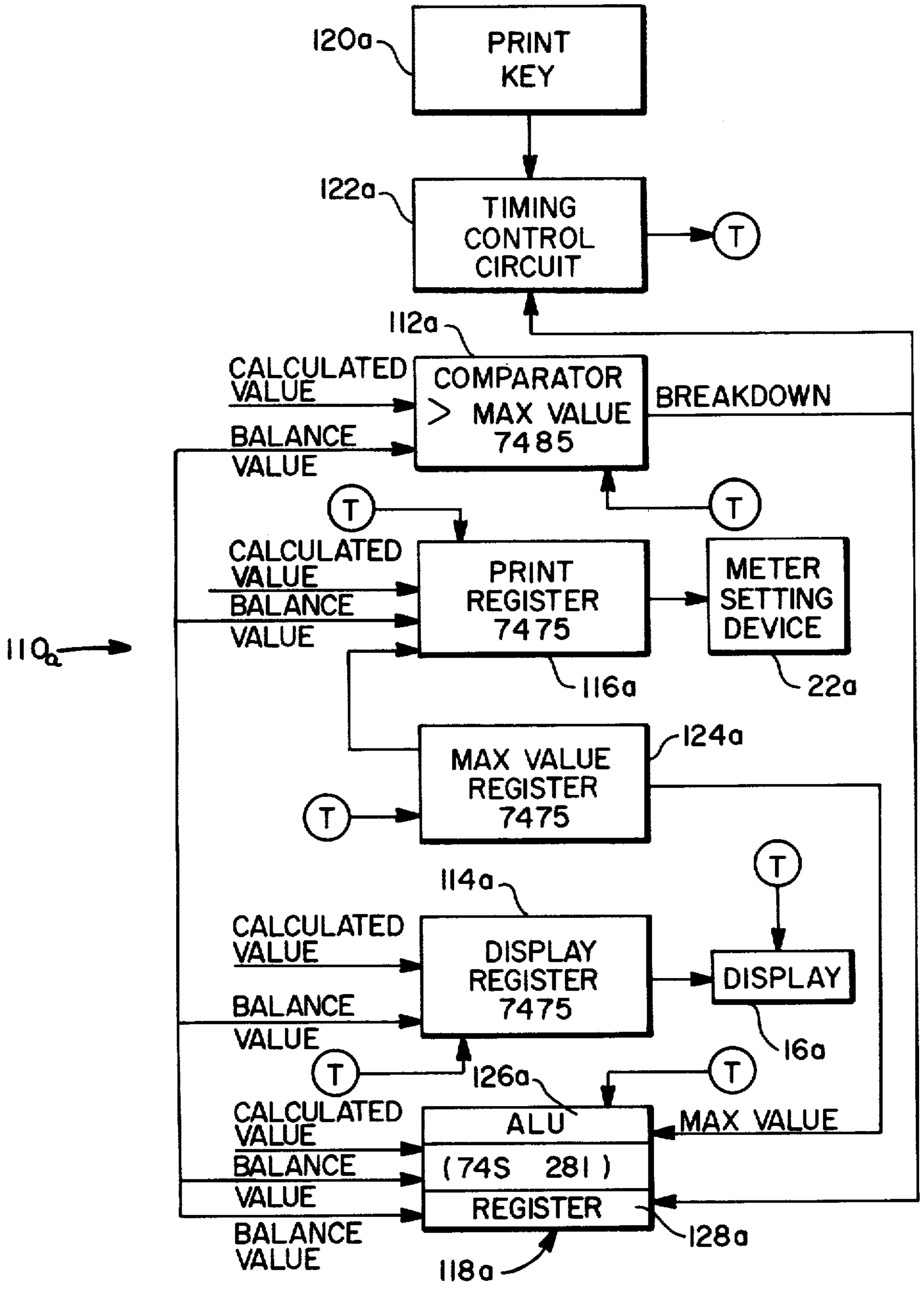
FIG. 6 is a schematized block diagram of a typical circuit constructed in accordance with an alternate embodiment of the invention.

In FIG. 6 a typical circuit 110*a* constructed in accordance with an alternate embodiment of the invention is illustrated. The circuit 110*a* includes a comparator 112*a* which is preset with the maximum digit printing capacity of the postage meter (MAX) VAL). A CALCULATED VALUE signal which is indicative of the requisite postage as calculated by the processor is transmitted to the comparator 112*a*. The CALCULATED VALUE signal is also transmitted to a display register 114*a*, a print register 116*a* and an accumulator 118*a*.

A timing control circuit 122*a* provides sequencing signals T for the circuit 110*a*. The comparator 112*a* determines whether or not the CALCULATED VALUE exceeds the MAX VAL. If the CALCULATED VALUE is greater than the MAX VAL, the comparator output which comprises a BREAKDOWN signal, becomes high. In the event the CALCULATED VALUE does not exceed the digit printing capacity, the BREAKDOWN signal is low and, upon operator actuation of a print key 120*a*, the timing control circuit 122*a* actuates the print register 116*a* to load the CALCULATED VALUE into a meter setting device 22*a* for printing of the calculated postage.

In the event the CALCULATED VALUE exceeds the MAX VAL, a high BREAKDOWN signal will be present at the timing control circuit 122*a*. Upon operator actuation of the print key 122*a*, the timing circuit pulses the CALCULATED VALUE which appears at a display 16*a*. The timing control circuit 122*a* thereafter awaits a second depression of the print key 120*a* and provides a signal to a maximum value register 124*a*. The maximum value register 124*a* is preset with the MAX VAL and, upon receipt of the signal from the timing control circuit 122*a*, the stored MAX VAL signal is transmitted to the print register 116*a*. Thereafter, the timing control circuit 122*a* provides a signal to the print register 116*a* and the MAX VAL is loaded from the print register into the meter setting device 22*a* for printing of the maximum value.

In addition, the timing control circuit 122*a* provides a signal to the accumulator 118*a* which may comprise an arithmetic logic unit (ALU) 126*a* and a shift/storage matrix or register 128*a*. Upon receipt of appropriate sequencing signals from the timing control circuit 122*a*, the ALU 126*a* accepts the CALCULATED VALUE signal and subtracts from such value the preset MAX VAL. The resulting difference or BALANCE VALUE is temporarily retained at the accumulator register 128*a*. Upon receipt of appropriate sequencing signals, the register 128*a* transmits the BALANCE VALUE signal to the comparator 112*a*, the print register 116*a*, the display register 114*a* and the ALU 126*a*.

Thereafter, the timing control circuit 122*a* initiates a further comparison between the BALANCE VALUE and the MAX VAL at the comparator 112*a*. In the event the BALANCE VALUE does not exceed the MAX VAL, the BREAKDOWN signal will be low and, upon operator actuation of the print key 120*a*, the timing control circuit 122*a* will actuate the print register to load the BALANCE VALUE into the meter setting device 22*a* for printing.

In the event the BALANCE VALUE exceeds the MAX VAL, the BREAKDOWN signal will be high, and, upon operator actuation of the print key 120*a*, the timing control circuit 122*a* will actuate the maximum value register 124*a* and print register 116*a* for a further printing of the maximum value and initiates a further subtraction at the ALU 126*a*. The ALU 126*a* will receive the prior BALANCE VALUE and subtract therefrom the preset MAX VAL to obtain a new BALANCE VALUE.

The cycle continues until such time as the last generated BALANCE VALUE does not exceed the MAX VAL and the BREAKDOWN signal is low. Upon such occurrence, operator actuation of the print key 120*a* will provide a sequencing signal to the print register 116*a* for the printing of the final BALANCE VALUE and the total value of the sequentially printed tapes will be that of the original CALCULATED VALUE.

By way of example, the display, print and maximum value registers may each comprise a plurality of 7475 four bit bistable latches. Three or four latches which are connected in cascade are employed depending upon the number of banks of the postage meter 24. The comparator may comprise three or four 7485 four bit magnitude comparators connected in cascade. A typical composite accumulator which may be employed in conjunction with the circuit 110 may comprise three or four type 74S281 four bit parallel binary accumulators. As previously mentioned, the ALU portion of the accumulator performs the subtraction function while the shift/storage matrix portion temporarily stores the difference or balance value.

Thus, it will be seen that there is provided a mailing system with sequential printing control which achieves the various objects of the invention and which is well adapted to meet conditions of practical use.

Various changes to the system and method herein described are readily apparent to those skilled in the art. Accordingly, the present invention should not be constrained to the implementations shown and all matter herein described and shown in the accompanying drawings is to be interpreted as illustrative and not in a limiting sense.

Having thus described the invention, there is claimed as new and desired to be secured by Letters Patent:

1. A method of enabling a mailing system to print a calculated postage value which exceeds the maximum digit printing capacity of its meter means, the system comprising meter means for imprinting a postage value and means operatively connected to the meter means for setting a postage amount to be printed, and control means for computing a postage value and controlling said meter means and said meter setting means, the method comprising the steps of:

(a) determining the maximum digit printing capacity of the meter means, (b) comparing a calculated postage value for mailing an article with the determined maximum digit printing capacity, (c) actuating the meter means to print the calculated value if the calculated value does not exceed the determined value, or (d) actuating the meter means to sequentially print a succession of postage values, the sum of which corresponds to the calculated postage value if the calculated postage value exceeds the determine maximum value.

2. A method of enabling an automated mailing system to print a calculated postage value which exceeds the maximum digit printing capacity of its meter means as set forth in claim 1 further including the steps of providing an operator alert signal if the calculated value exceeds the determined maximum value prior to actuating the meter to sequentially print the succession of postage values.

3. A method of enabling an automated mailing system to print a calculated postage value which exceeds the maximum digit printing capacity of its meter means as set forth in claim 2 further including the step of awaiting an operator response after providing the operator alert signal and before actuating the meter to sequentially print a succession of postage values.

4. An automated mailing system comprising:
(a) meter means for imprinting a postage value, said meter means having a maximum digit printing capacity;
(b) means operatively connected to said meter means for setting a particular postage value to be printed;
(c) a numeric display;
(d) means for inputting data; and,
(e) control means operatively associated with said meter means, said meter setting means, said display and said data input means, for;
(1) calculating a postage value for an article to be mailed in response to data from said data input means and generating and transmitting to said display a signal indicative of said value so that said value is displayed to an operator;
(2) comparing said value to said maximum digit printing capacity;
(3) if said value is less than said maximum capacity transmitting said value to said meter setting means so that said meter means is set to said value and causing said meter means to print said value;
(4) if said value is greater than said maximum capacity causing said displayed value to sequently flash so that said operator is alerted.

5. An automated mailing system as described in claim 4 further comprising means actuated by said operator, for generating an initiate signal in response to said flashing display and wherein said control means, in response to said initiate signal, generates a plurality of sequential postage values the sum of said plurality equaling the calculated postage value and each of said sequential values being not greater than said maximum capacity, and said control means transmitting signals corresponding to at least each different one of said sequential values to said meter setting means so that said meter means is set to each of said sequential values and said control means causing said meter means to print each of said sequential values so that the total printed equals said calculated value.

6. An automated mailing system as described in claim 5 wherein said control means, in response to said initiate signal;
(a) subtracts said maximum capacity from a balance, said balance being initially equal to said calculated value;
(b) if the remainder of said subtraction is larger than 0 said control means transmits a signal, at least if necessary, corresponding to said maximum capacity to said meter setting means so that said meter means is set to said maximum capacity, and causes said meter means to print said maximum capacity value;
(c) if said remainder is less than 0 said control means transmits a signal corresponding to said balance to said meter setting means so that said meter means is set to said balance, and causes said meter means to print said balance;
(d) otherwise sets said balance equal to said remainder; and,
(e) repeats steps "a", "b", and "d" until step "c" is reached whereby a computed value greater than said maximum capacity is printed as a sequence of postage values.

7. An automated mailing system as described in claims 5 or 6 wherein said control means checks for the presence of said initiate signals prior to printing each of said sequential values.

8. An automated mailing system as described in claim 7 wherein said data input means comprises a scale for weighing said article to be mailed and said postage value is generated in accordance with the weight of said article.

* * * * *